United States Patent
Park et al.

(10) Patent No.: US 8,537,977 B2
(45) Date of Patent: Sep. 17, 2013

(54) APPARATUS AND METHOD FOR VOICE PROCESSING IN MOBILE COMMUNICATION TERMINAL

(75) Inventors: Seong Soo Park, Seoul (KR); Sang Shin Lee, Seoul (KR); Jae Hwang Yu, Seoul (KR); Jong Tae Ihm, Seongnam-si (KR)

(73) Assignee: SK Telecom. Co., Ltd, Seoul (KR)

( * ) Notice: Subject to any disclaimer, the term of this patent is extended or adjusted under 35 U.S.C. 154(b) by 1084 days.

(21) Appl. No.: 12/525,050

(22) PCT Filed: Apr. 4, 2008

(86) PCT No.: PCT/KR2008/001942
§ 371 (c)(1),
(2), (4) Date: Jul. 29, 2009

(87) PCT Pub. No.: WO2008/123721
PCT Pub. Date: Oct. 16, 2008

(65) Prior Publication Data
US 2010/0100374 A1    Apr. 22, 2010

(30) Foreign Application Priority Data

Apr. 10, 2007 (KR) .................. 10-2007-0035046
Feb. 22, 2008 (KR) .................. 10-2008-0016382

(51) Int. Cl.
*H04M 1/64* (2006.01)
(52) U.S. Cl.
USPC ............. 379/88.01; 379/388.01; 704/270; 704/226; 381/71.1
(58) Field of Classification Search
USPC ............ 379/80, 388.01, 386, 283, 282, 351, 379/88.01, 32.01, 110.01; 704/275, 270, 704/272, 226; 341/155; 381/71.1
See application file for complete search history.

(56) References Cited

U.S. PATENT DOCUMENTS

| | | | | |
|---|---|---|---|---|
| 5,371,901 A | * | 12/1994 | Reed et al. | 455/69 |
| 5,619,565 A | * | 4/1997 | Cesaro et al. | 379/386 |
| 5,768,351 A | * | 6/1998 | England | 379/93.37 |
| 6,167,116 A | * | 12/2000 | Freadman | 379/88.01 |

(Continued)

FOREIGN PATENT DOCUMENTS

| | | |
|---|---|---|
| JP | 2001-189999 | 7/2001 |
| JP | 2004-023535 | 1/2004 |

(Continued)

OTHER PUBLICATIONS

International Search Report mailed Aug. 14, 2008 for PCT/KR2008/001942.

*Primary Examiner* — Vijay B Chawan
(74) *Attorney, Agent, or Firm* — Lowe Hauptman & Ham LLP (57) ABSTRACT

Disclosed are an apparatus and a method for voice processing in a mobile communication terminal. A plurality of microphones are used to remove environmental noise at the time of voice communication, so that it is possible to perform high-quality voice communication and video telephony. Moreover, it is possible to perform voice recording even when a user does not open a mobile communication terminal. Furthermore, when voice is recorded or sound is recorded during moving image photographing, a plurality of microphones are effectively utilized to achieve good-quality recording and to perform recording conveniently even when the folder or the slider of the mobile communication terminal is closed. Therefore, it is possible to provide improved convenience in using the mobile communication terminal.

19 Claims, 5 Drawing Sheets

(56) References Cited

U.S. PATENT DOCUMENTS 6,246,985 B1 * 6/2001 Kanevsky et al. ............ 704/270
6,717,991 B1 * 4/2004 Nordholm et al. ............ 375/285
7,164,620 B2 * 1/2007 Hoshuyama .................. 367/129

FOREIGN PATENT DOCUMENTS

| KR | 10-2004-0014688 | 2/2004 |
| KR | 10-2004-0070966 | 8/2004 |
| KR | 10-2005-0015041 | 2/2005 |

* cited by examiner

APPARATUS AND METHOD FOR VOICE PROCESSING IN MOBILE COMMUNICATION TERMINAL

CROSS REFERENCE TO RELATED APPLICATION

This application claims the priority of Korean Patent Application No. 10-2007-0035046, filed on Apr. 10, 2007, and Korean Patent Application No. 10-2008-0016382, filed on Feb. 22, 2008 in the KIPO (Korean Intellectual Property Office), the disclosure of which is incorporated herein in their entirety by reference. Further, this application is the National Phase application of International Application No. PCT/KR2008/001942, filed Apr. 4, 2008, which designates the United States and was published in English. Each of these applications is hereby incorporated by reference in their entirety into the present application.

TECHNICAL FIELD

The present invention relates to a voice processing in a mobile communication terminal, and more particularly, to an apparatus and a method for voice processing in a mobile communication terminal, which not only removes noise from environmental noise at the time of voice communication so as to perform voice communication with high quality, but also combines signals of corresponding microphones at the time of voice recording and moving image photographing so as to vividly record original sound, by using a plurality of microphones installed on a mobile communication terminal.

BACKGROUND ART

In general, communication devices for providing voice communication services employ techniques for removing environmental noise in order to deliver the caller's voice effectively.

A conventional mobile communication terminal performs a process of removing interference by environmental noise, so as to provide good-quality communication to users. In this case, environmental noise input with a low intensity level is removed or eliminated by simply using a filter, and only voice signals input with a relatively high intensity level are amplified and then transmitted. However, although the conventional technique for removing environmental noise interference has advantage in that, since a filter is used for noise cancelation or noise elimination, it is simple to implement the technique, it has disadvantage in that, since some voice signals are removed together with the environmental noise in case there is the environmental noise is loud, the caller's voice signals delivered to a communication partner may be discontinuous.

With the technical development, the function modules built in a mobile communication terminal are becoming more and more high-performance and miniaturized, and with the diversification of users' demands, various functions, such as a camera, an MP3, etc., are additionally built in the mobile communication terminal, some of which comprise functions of external voice recording or phone conversation recording. The function for recording external voice or phone conversation is executed by selection of a separate menu provided in the mobile communication terminal. The user has to open the folder or the slider of a mobile communication terminal to select the corresponding function from the menu. However, because the microphone for sound input is hidden when the folder or the slider is closed, the user is inconvenienced by having to open the folder or the slider of the mobile communication terminal in order to record voice or other sound.

DISCLOSURE OF INVENTION

Technical Problem

The present invention has been made in view of the above-mentioned problems, and the present invention provides an apparatus and a method for voice processing in a mobile communication terminal, which can not only remove environmental noise at the time of voice communication so that it is possible to perform high-quality voice communication, but also perform voice recording even when a user does not open a mobile communication terminal, by using a plurality of microphones.

Also, the present invention provides an apparatus and a method for voice processing in a mobile communication terminal which effectively utilizes a plurality of microphones provided on a mobile communication terminal, thereby performing good-quality recording, when a voice is recorded or sound is recorded during moving image photographing.

Technical Solution

In accordance with an aspect of the present invention, there is provided an apparatus for voice processing in a mobile communication terminal, the apparatus comprising: a first microphone used as a main microphone for inputting sound signals, the first microphone being installed on a body of the mobile communication terminal; a second microphone used as a secondary microphone for inputting sound signals, the second microphone being installed to be exposed to the outside of the mobile communication terminal and being arranged in a direction different from that of the first microphone; a voice and noise processor for removing noise from among the sound signals input through the first and second microphones and outputting the resulting signals; a service selection unit for switching paths of signals input from the voice and noise processor and delivering the resulting signals; a voice recording function processor for encoding the signals delivered through the service selection unit, storing the encoded signals in a memory, and recording the stored signals; a voice codec processor for coding the signals delivered through the service selection unit and outputting the coded signals to a modem; and a controller for activating the first and second microphones according to the a user's function key input and controlling operations of the voice and noise processor and the service selection unit.

The voice and noise processor comprises: a voice signal identification unit for performing an operation under the control of the controller, and identifying and outputting voice signals from among input signals based on signal identification information, used for voice signal identification and stored therein, when receiving signals input through the first and second microphones; a noise processor for performing an operation under the control of the controller, and removing noise from among voice signals input from the voice signal identification unit based on the noise of the signals input through the second microphone, or bypassing the voice signals input from the voice signal identification unit and signals input from the second microphone without a noise cancelation processing; and a signal filtering/combination processor for performing an operation under the control of the controller, and performing an additional filtering for noise-free signals input through the noise processor, combining two signals bypassed and input through the noise processor, or bypassing the signals without filtering or combination and then delivering the resulting signals to the service selection unit.

The voice recording function processor can perform recording of sound signals received through the first and second microphone in a mono mode or a stereo mode. In case of performing mono-based recording, sound signals received through the first and second microphones are combined by the signal filtering/combination processor of the voice and noise processor and the combined signals are encoded and stored in a memory for recording by the voice recording function processor. In case of performing stereo-based recording, sound signals received through the first and second microphones are bypassed by the signal filtering/combination processor, and the bypassed sound signals received through the first and second microphones are subjected to a stereo processing by the voice recording function processor. The voice recording function processor may comprise a stereo processor in order to subject sound signals received through the first and second microphones to a stereo processing.

In accordance with another aspect of the present invention, there is provided an apparatus for voice processing in a mobile communication terminal, the apparatus comprising: a first microphone installed on one side of the mobile communication terminal; a second microphone installed on the other side of the mobile communication terminal; a voice and noise processor for bypassing and outputting sound signals received through the first microphone and sound signals received through the second microphone, or removing and outputting noise from among the first and second sound signals, respectively; a voice recording function processor for encoding signals output from the voice and noise processor; and a controller for controlling operations of the voice and noise processor and the voice recording function processor according to a recording mode of the first and second sound signals.

When the recording mode of the first and second sound signals is a mono mode, the voice and noise processor may comprise: a noise processor for removing noise from the first and second sound signals; and a signal filtering/combination processor for combining the noise-free first sound signals with the noise-free second sound signals, thereby generating synthesized signals.

When the recording mode of the first and second sound signals is a mono mode, the voice and noise processor may comprise: a noise processor for bypassing the first and second sound signals without a noise cancelation processing; and a signal filtering/combination processor for combining the bypassed first and second sound signals, thereby generating synthesized signals.

When the recording mode of the first and second sound signals is a stereo mode, the voice and noise processor may bypass the first and second sound signals without a noise cancelation processing.

In accordance with another aspect of the present invention, there is provided a method for processing voice in a mobile communication terminal, the method comprising the steps of: when a voice communication function is selected, activating a first microphone primarily used for inputting sound signals and a second microphone, which is used for inputting sound signals and is installed in a direction different from that of the first microphone, by a controller, removing noise from among signals input through the first microphone based on the noise of the signals input through the second microphone, performing an additional filtering, and delivering the filtered signals to a voice codec processor by a voice and noise processor, and coding the delivered signals and outputting the coded signals to a modem by the voice codec processor.

In accordance with another aspect of the present invention, there is provided a method for processing voice in a mobile communication terminal, the method comprising the steps of: in case a folder or a slider of the mobile communication terminal is opened when a voice recording is selected, activating the first and second microphones by the controller, removing noise from among signals input through the first and second microphones based on the noise of the signals input through the second microphone, performing the additional filtering, and delivering the filtered signals via the service selection unit to the voice recording function processor by the voice and noise processor, and encoding the delivered signals and storing and recording the resulting signals in a memory by a voice recording function processor.

In accordance with another aspect of the present invention, there is provided a method for processing voice in a mobile communication terminal, the method comprising the steps of: when moving image photographing function is selected, activating the first and second microphones by the controller, and selectively storing and recording signals of the first and second microphones in a mono mode or a stereo mode without subjecting the signals input through the first and second microphones to a noise cancelation processing or an additional filtering processing by the voice and noise processor. In case of performing sound recording after a user of the mobile communication terminal selects a moving image photographing function, the user may select which one of a mono mode or a stereo mode is to be used for recording the sound.

Herein, when the signals of the first and second microphones are recorded in a mono mode, signals of the first and second microphones, which are not subjected to a noise cancelation processing or an additional filtering processing, are combined without processing and then the combined signals are delivered to the voice recording function processor, and the voice recording function processor encodes the delivered signals and stores the encoded signals in a memory for recording.

When it is selected that the signals of the first and second microphones are recorded in a stereo mode, the signals of the first and second microphones, which have been bypassed without a noise cancelation processing or an additional filtering processing, are delivered via the service selection unit to the voice recording function processor, and then the voice recording function processor subjects the delivered signals to a stereo processing and stores the processed signals in the memory for stereo-based recording.

The method may further comprise the step of: activating the second microphone by the controller, delivering signals of the second microphone via the service selection unit to the voice recording function processor without subjecting the signals input through the second microphone to a noise cancelation processing or an additional filtering processing by the voice and noise processor; and encoding the delivered signals and storing the encoded signals in a memory for recording by the voice recording function processor, in case the folder or the slider of the mobile communication terminal is closed when a voice recording function is selected.

The method may further comprise the step of: activating the first and second microphones by the controller, combining the signals of the first and second microphones without subjecting the signals input through the first and second microphones to the noise cancelation processing or the additional filtering processing and delivering the resulting signals via the service selection unit to the voice recording function processor by the voice and noise processor, and encoding the delivered signals, after storing and recording the encoded signals in a memory for recording by the voice recording function processor, in case the folder or the slider is opened when a voice recording is selected.

The mobile communication terminal comprises a recording function key for selecting a voice recording function in case the folder or the slider of the mobile communication terminal is closed, wherein the recording function key being installed to be exposed to the outside of the mobile communication terminal.

In accordance with another aspect of the present invention, there is provided a method for processing voice in a mobile communication terminal, the method comprising the steps of: receiving a first sound signal through the first microphone and receiving a second sound signal through the second microphone; determining whether a recording mode of the received first and second sound signals is set to a mono mode or a stereo mode; combining the first sound signals with the second sound signals to generate synthesized signals when the recording mode of the received first and second signals is set to a mono mode, based on the determination result; encoding the combined signals and storing the encoded signals in a mono mode; and encoding each of the first sound signals and the second sound signals and storing the encoded signals in a stereo mode when the recording mode of the received first and second sound signals is set to a stereo mode, based on the determination result.

The method may further comprise the step of removing noise of the first sound signal based on the noise of the second sound signals when the recording mode of the first and second sound signals is set to a mono mode, based on the determination result.

Advantageous Effects

According to the present invention, by using a plurality of microphones, it is possible not only to remove environmental noise during voice communication so as to perform voice communication and video telephony with high quality, but also to perform voice recording even when a user does not open the folder or the slider of a mobile communication terminal. In a case where voice is recorded or sound is recorded during moving image photographing, a plurality of microphones provided on a mobile communication terminal are utilized effectively, so that it is possible to perform recording with high quality and it is convenient to perform recording even when the folder or the slider of the mobile communication terminal is closed. Therefore, it is possible to improve convenience of the mobile communication terminal.

BRIEF DESCRIPTION OF THE DRAWINGS

The foregoing and other objects, features and advantages of the present invention will become more apparent from the following detailed description when taken in conjunction with the accompanying drawings in which.

MODE FOR THE INVENTION

Hereinafter, exemplary embodiments of the present invention will be described with reference to the accompanying drawings.

According to the present invention, a plurality of microphones provided on a mobile communication terminal are used not only to remove environmental noise so that it is possible to perform voice communication and video telephony with high quality, but also to perform voice recording even when a user does not open a mobile communication terminal. Furthermore, it is possible to perform high-quality recording by efficiently utilizing a plurality of microphones provided on a mobile communication terminal in a case where voice is recorded or sound is recorded during moving image photographing.

Figure 1:
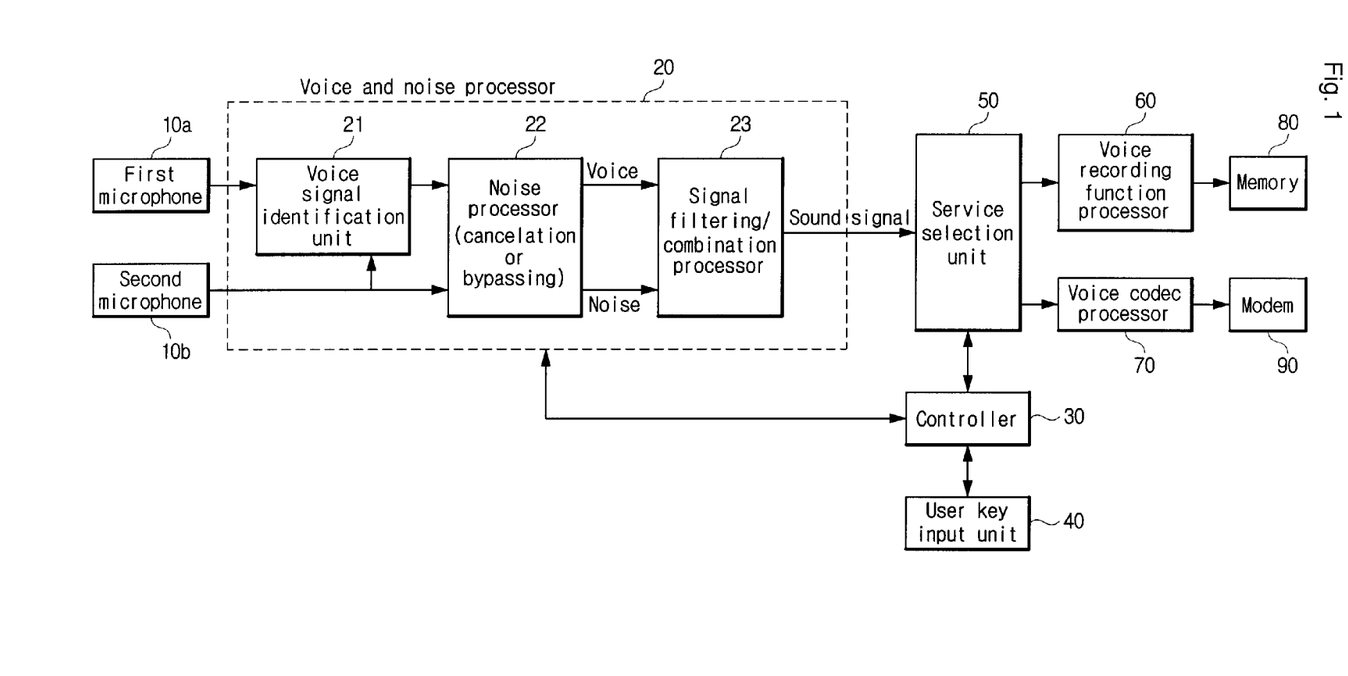
FIG. 1 is a block diagram showing a construction of an apparatus for voice processing in a mobile communication terminal according to the present invention.

Referring to FIG. 1, an apparatus for voice processing in a mobile communication terminal according to the present invention comprises first and second microphones 10*a* and 10*b*, a voice and noise processor 20, a controller 30, a user key input unit 40, a service selection unit 50, a voice recording function processor 60, a voice codec processor 70, a memory 80, and a modem 90.

The first microphone 10*a* is used as a main microphone at the time of voice communication and voice input parameters are optimized through initial tuning so that noise cancelation can be performed efficiently. Moreover, the second microphone 10*b* is arranged to be oriented in a direction different from that of the first microphone 10*a*. This is because, when the second microphone 10*b* is arranged to be oriented in the same direction as the first microphone 10*a*, environmental noise cancelation processing performance in the voice and noise processor 20 is degraded. Therefore, in the process of design and development of the mobile communication terminal, the second microphone 10*b* must be arranged at such a position that external sound recording can be performed smoothly while the performance of environmental noise cancelation is assured. Such first and second microphones 10*a* and 10*b* are selectively activated or inactivated under the control of the controller 30.

Moreover, the voice and noise processor 20 processes voice and noise signals input from the first and second microphones 10*a* and 10*b* under the control of the controller 30, and then outputs the processed voice and noise signals to the service selection unit 50. The voice and noise processor 20 comprises a voice signal identification unit 21, a noise processor 22, and a signal filtering/combination processor 23.

Furthermore, the voice and noise processor 20 processes voice and noise input for voice communication, voice recording or sound recording in moving image photographing, under the control of the controller 30. For the voice communication, the voice and noise processor 20 removes noise from voice and noise signals input from the first and second microphones 10*a* and 10*b* and then outputs the resulting signals to the service selection unit 50. For the voice recording, the voice and noise processor 20 removes noise from voice and noise signals input through the first and second microphones 10*a* and 10*b* and then outputs the resulting signals to the service selection unit 50, outputs signals input through only the second microphone 10*b* to the service selection unit 50 without processing, or combines signals input through the first and second microphones 10a and 10b, and then outputs the resulting signals to the service selection unit 50. For the sound recording during the moving image photographing, the voice and noise processor 20 either combines signals input through first and second microphones 10a and 10b so that they can be recorded in a mono mode and then outputs the resulting signals to the service selection unit 50, or bypasses signals input through the first and second microphones 10a and 10b without combination thereof and then outputs the resulting signals to the service selection unit 50.

The voice signal identification unit 21 is driven under the control of the controller 30 and has signal identification information for voice signal identification provided therein. When the voice signal identification unit 21 receives signals through the first and second microphones 10a and 10b, the voice signal identification unit 21 identifies voice signals from the input signals based on corresponding signal identification information, and outputs the resulting signals to the noise processor 22. In case of performing voice communication or voice recording, the voice signal identification unit 21 receives main voice signals together with noise input through the first microphone 10a and relatively week voice signals together with noise input through the second microphone 10b, and then identifies voice signals from among signals input through the first and second microphones 10a and 10b based on the voice signal identification information stored therein and outputs the resulting signals to the noise processor 22.

The noise processor 22 performs a process of removing noise from the input signals or performs a process of bypassing the input signals without noise processing, under the control of the controller 30. In case of performing voice communication or voice recording after removing noise from voice, the noise processor 22 either removes noise from signals input from the voice signal identification unit 21 or separates noise, if necessary, based on noise input from the second microphone 10b. In case of performing voice recording or moving image photographing recording without noise cancelation, the noise processor 22 bypasses input signals without performing a noise cancelation processing for the input signals.

Under the control of the controller 30, the signal filtering/combination processor 23 either performs an additional filtering for signals input through the noise processor 22 so as to remove noise and delivers the resulting signals to the service selection unit 50, combines voice signals (i.e. signals received through the first microphone) with noise signals (i.e. signals received through the second microphone) which are input through the noise processor 22 and then delivers the resulting signals to the service selection unit 50, or bypasses the voice signals and the noise signals without combination and then delivers the resulting signals to the service selection unit 50. Moreover, in case of performing voice communication or voice recording after removing noise from voice, the signal filtering/combination processor 23 removes noise by performing an additional filtering for the signals input through the noise processor 22 and outputs the resulting signals. In case of performing voice recording or moving image photographing recording without noise cancelation, the signal filtering/combination processor 23 either combines corresponding voice and noise signals (when recorded in a mono mode) without subjecting voice and noise signals input through the noise processor 22 to an additional filtering processing, or bypasses corresponding voice and noise without combination signals (when recorded in a stereo mode), and then outputs the resulting signals.

The service selection unit 50 is driven under the control of the controller 30 so that it can deliver signals, applied from the voice and noise processor 20, to one of the voice recording function processor 60 and the voice codec processor 70, so as to selectively provide various services including voice recording, voice recording of moving image photographing, or voice communication. In case of performing voice recording or voice recording of moving image photographing, the service selection unit 50 delivers sound signals applied from the voice and noise processor 20 to the voice recording function processor 60. In case of performing voice communication, the service selection unit 50 delivers sound signals applied from the voice and noise processor 20 to the voice codec processor 70.

The voice recording function processor 60 encodes the sound signals delivered through the service selection unit 50 and then stores the resulting signals in the memory 80 for recording processing. In case of performing voice recording or voice recording of moving image photographing, the voice recording function processor 60 processes the sound signals delivered through the service selection unit 50 in a mono mode or a stereo mode, encodes the processed signals, and stores the encoded signals in the memory 80, thereby recording the sound signals.

Figure 2:
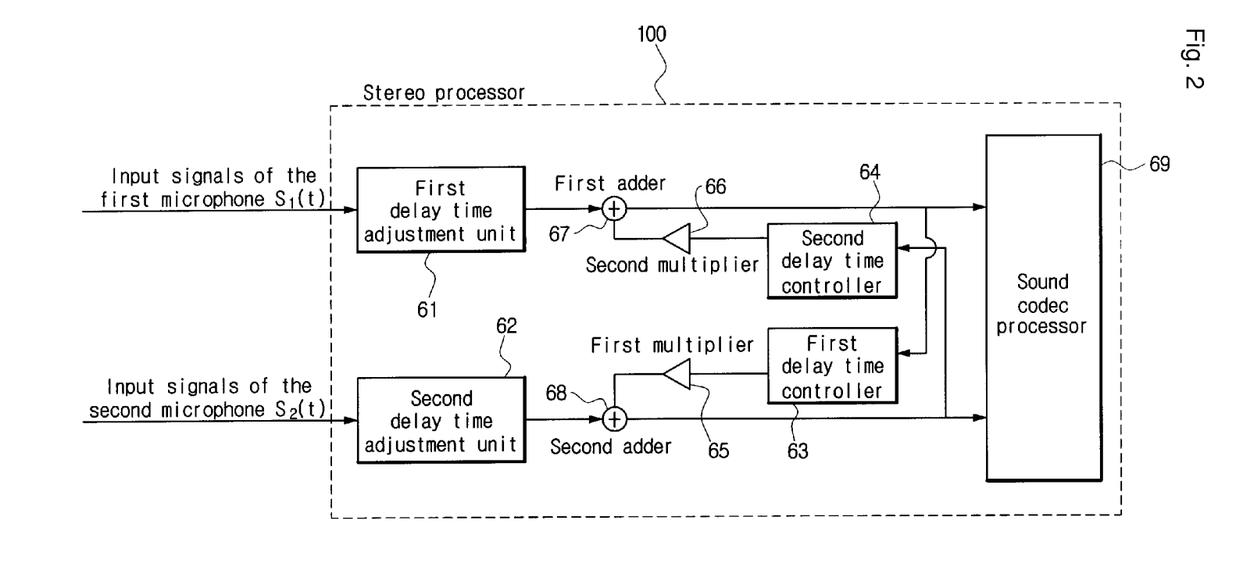
FIG. 2 is a block diagram showing a construction of a stereo processor provided within a voice recording function processor in an apparatus for voice processing of a mobile communication terminal according to the present invention.

The voice recording function processor 60 may further comprise a stereo processor 100 in order to record signals input through the first and second microphones 10a and 10b in a stereo mode. FIG. 2 is a block diagram showing a construction of a stereo processor.

The stereo processor 100 calculates in advance the parameters required to synchronize signals of each microphone, with respect to positions, directions of, and distance between the first and second microphones 10a and 10b, and then stores the calculated parameters.

Meanwhile, there may be difference in time taken for signals of the first and second microphones 10a and 10b to arrive at the stereo processor of the voice recording function processor 60. In this case, the stereo processor 100 must synchronize the signals from the first and second microphones 10a and 10b.

To this end, the stereo processor 100 must know the difference of times required for the signals of the activated first and second microphones 10a and 10b to arrive at the stereo processor 100 of the voice recording function processor 60.

When input signals of the first microphone $s_1(t)$ arrive at the stereo processor 100 faster than input signals of the second microphone $s_2(t)$, a first delay time adjustment unit 61 delays input signals until the input signals of the second microphone $s_2(t)$ arrive at the stereo processor 100. And, when the input signals of the second microphone $s_2(t)$ arrive at the stereo processor 100 faster than the input signals of the first microphone $s_1(t)$, a second delay time adjustment unit 62 delays input signals until the input signals of the first microphone $s_1(t)$ arrive at the stereo processor 100. When input signals of the microphones having already been synchronized arrive at the stereo processor 100 at the same time, the first delay time adjustment unit 61 and the second delay time adjustment unit 62 bypass corresponding signals.

The two synchronized voice signals are delayed for a predetermined time by each of delay time controllers 63 and 64 so as to provide stereo effect, and then the input signals are adjusted by multipliers 65 and 66, respectively.

That is, the input signals of the first microphone are delayed for a predetermined time by the first delay time controller 63, and then the resulting signals are reduced to a certain level (e.g. 93.75%) relative to the original input signals by the first multiplier 65, and the reduced signals are combined with the input signals of the second microphone by a second adder 68. Also, the input signals of the second microphone are delayed for a predetermined time by the second delay time controller 64, and then the resulting signals are reduced to a certain level (e.g. 93.75%) of the original input signals by the second multiplier 66, and the reduced signals are combined with the input signals of the first microphone by a first adder 67.

The output signals generated by the combination are input to a sound codec processor 69 and the input signals are encoded and recorded into stereo sound.

In the present invention, the orientations of two microphones in different directions in a mobile communication terminal makes it possible to effectively generate stereo sound by performing compensation operation of sound signals for one microphone, with respect to the other microphone. To this end, the magnitude of the other input signals must be adjusted by adjusting a subtraction value for the corresponding input signals. This must be set in an initial sound examination process at the time of manufacturing of a mobile communication terminal, and be reflected on a delay time controller.

A voice codec processor 70 performs coding for sound signals delivered through the service selection unit 50 and transmits the coded signals through a modem 90. In case of performing voice communication, the voice codec processor 70 performs coding for sound signals delivered through the service selection unit 50 and transmits the coded signals through the modem 90, thereby transmitting communication voice to a wireless communication terminal of a communication partner.

The user key input unit 40 comprises a key for selection of driving of a mobile communication terminal, and further comprises function selection keys for execution of various functions (e.g. voice communication, voice recording, voice recording of moving image photographing, mono-based recording, and stereo-based recording). The user key input unit 40 inputs a corresponding function selection key input information to the controller 30 when a user presses a corresponding key.

Also, the controller 30 performs overall control operations for voice processing in a mobile communication terminal, and controls the driving of the voice and noise processor 20 and the service selection unit 50 according to a function selected through the user key input unit 40, in addition to activation and inactivation of the first and second microphones 10a and 10b.

When a voice communication function is selected, the controller 30 controls not only the voice and noise processor 20 so that the voice and noise processor 20 can remove noise from among voice and noise signals, input through the first and second microphones 10a and 10b, and output the resulting signals to the service selection unit 50, but also the service selection unit 50 so that the service selection unit 50 can deliver sound signals, applied from the voice and noise processor 20, to the voice codec processor 70.

Moreover, when a voice recording function is selected, depending on whether the folder or the slider of the mobile communication terminal is opened or closed, the controller 30 controls not only the voice and noise processor 20 so that noise is removed from among voice and noise signals input through the first and second microphones 10a and 10b, and the resulting signals are output to the service selection unit 50, but also the service selection unit 50 so that the service selection unit 50 can deliver the sound signals applied from the voice and noise processor 20 to the voice recording function processor 60. Further, the controller controls not only the voice and noise processor 20 so that the voice and noise processor 20 outputs signals input through only the second microphone 10b without processing to the service selection unit 50, but also the service selection unit 50 so that the service selection unit 50 can deliver the sound signal, applied from the voice and noise processor 20, to the voice recording function processor 60. Furthermore, the controller 30 controls not only the voice and noise processor 20 so that the voice and noise processor 20 combines signals input through the first and second microphones 10a and 10b without processing and outputs the combined signals to the service selection unit 50, but also the service selection unit 50 so that the service selection unit 50 can deliver the sound signal, applied from the voice and noise processor 20, to the voice codec processor 70.

Also, when a function for recording voice during moving image photographing is selected, depending on whether the recording mode is a mono recording mode or a stereo recording mode, the controller 30 controls not only the voice and noise processor 20 so that the voice and noise processor 20 can either combine or bypass signals input through the first and second microphones 10a and 10b and output the resulting signals to the service selection unit 50, but also the service selection unit 50 so that the service selection unit 50 can deliver the sound signal, applied from the voice and noise processor 20, to the voice recording function processor 60.

Figure 3:
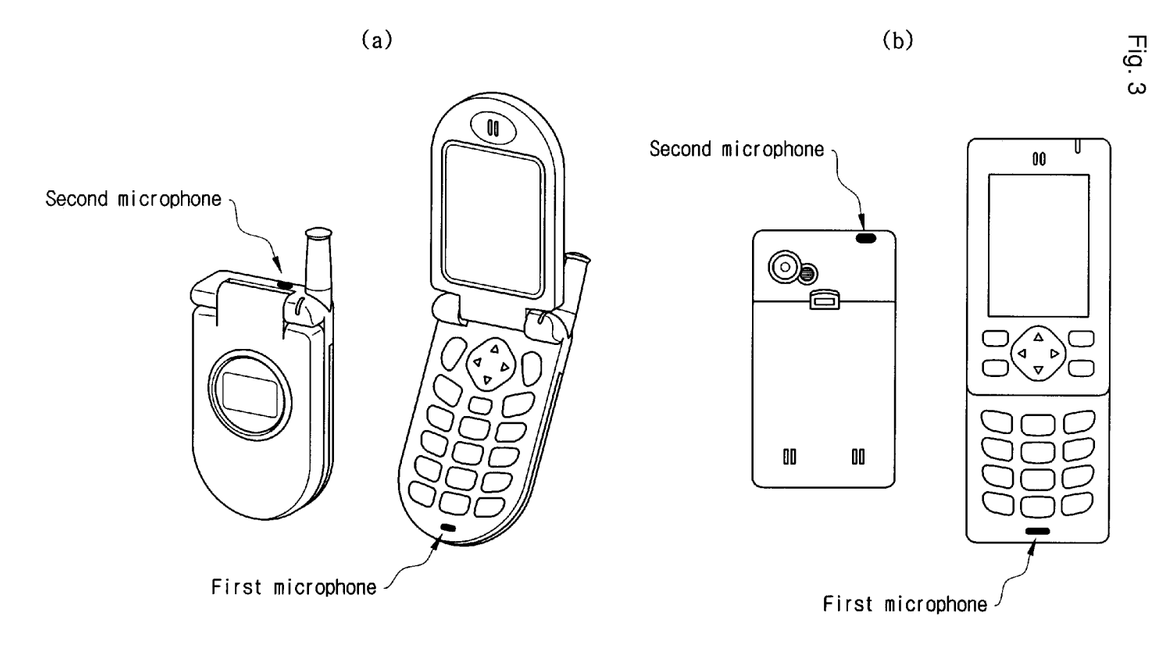
FIGS. 3(a) and 3(b) are views showing one embodiment of microphone arrangement in a mobile communication terminal according to the present invention.

The first and second microphones 10a and 10b are installed to be arranged in different directions. In case of a folder-type mobile communication terminal, as shown in FIG. 3(a), the first microphone 10a is installed to be exposed when a folder is opened, and the second microphone 10b is installed to be exposed to the outside of the folder. In case of a slide-type mobile communication terminal, as shown in FIG. 3(b)4(b) the first microphone 10a is installed to be exposed when a slider is opened, and the second microphone 10b is installed to be exposed to the outside of the slider.

Figure 4:
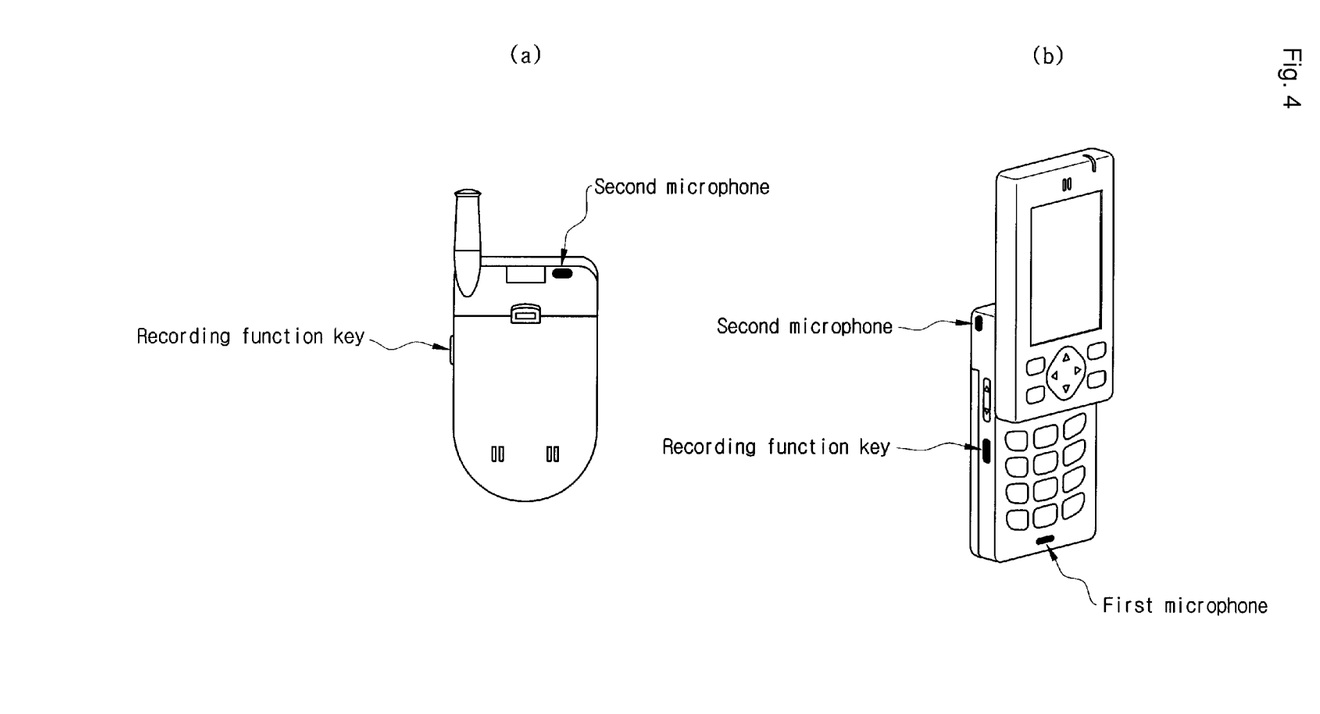
FIGS. 4(a) and 4(b) are views showing one embodiment of recording function key arrangement in a mobile communication terminal according to the present invention.

Further, it is possible to perform voice recording either in a state where the folder or the slider of the mobile communication terminal is opened or in a state where the folder or the slider of the mobile communication terminal is closed. In order to perform voice recording in a state where the folder or the slider of the mobile communication terminal is closed, a recording function key is provided at the outside of the mobile communication terminal. In case of a folder-type mobile communication terminal, as shown in FIG. 4(a), the recording function key is installed on one surface of the outside of a terminal so that a user can operate the recording function key even when the folder is closed. In case of a slide-type mobile communication terminal, as shown in FIG. 4(b), the recording function key is installed on one surface of the outside of a terminal, so that a user can operate the recording function key even when the slider is closed. Further, in addition to the recording function key, a voice communication function key or a moving image photographing function key may be installed on a keypad provided on a body of a mobile communication terminal. And, the recording function key may be further provided on a corresponding key pad, if necessary.

Figure 5:
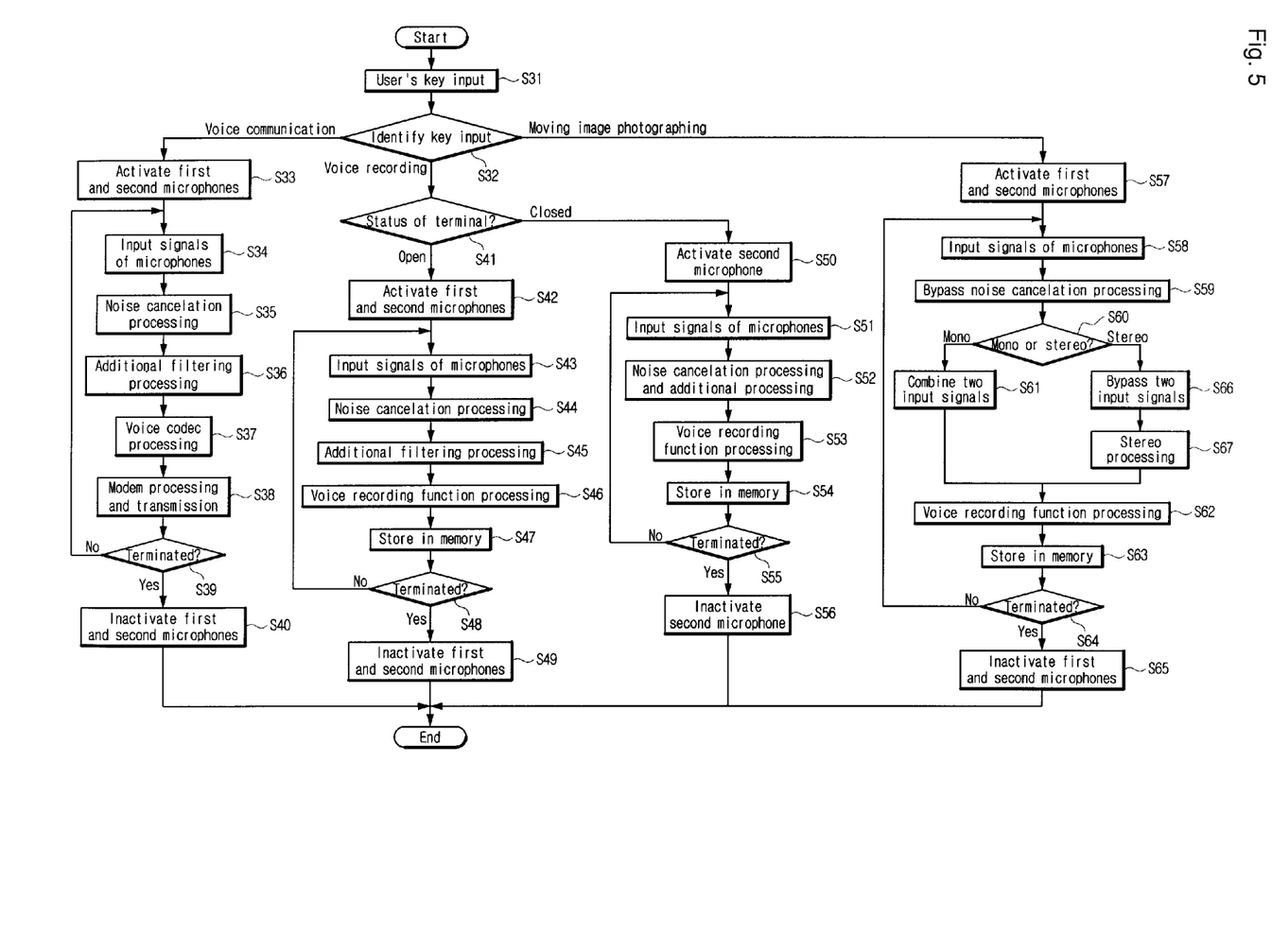
FIG. 5 is a flow diagram showing a process of voice processing in an apparatus for voice processing of a mobile communication terminal according to the present invention.

In case of performing voice communication, voice recording, and voice recording of moving image photographing, the apparatus for voice processing in the mobile communication terminal according to the present invention processes voice signals input through the first and second microphones 10a and 10b, operation of which is performed as shown in FIG. 5.

First, when a key mounted on the user key input unit 40 is pressed (step S31), the controller 30 determines which one function is selected by the pressed key (step S32).

In this case, when it is determined that a function key for voice communication is selected by the key input from the user key input unit 40, since the corresponding mobile communication terminal is being used for communication with the folder or the slider open, the controller 30 activates the first and second microphones 10a and 10b (step S33). Voice signals and noise signals obtained through the first and second microphones 10a and 10b are input to the voice and noise processor 20 (step S34). Loud voice signals and noise are input through the first microphone 10a and relatively week voice signals and noise are input through the second microphone 10b. The voice signal identification unit 21 of the voice and noise processor 20 is driven under the control of the controller 30, and identifies voice signals from among input signals of the first and second microphones 10a and 10b based on the signal identification information, stored therein and used for voice signal identification, and outputs the resulting signals to the noise processor 22. Then, the noise processor 22 is driven under the control of the controller 30, and performs a process of removing noise from among signals, input through the voice signal identification unit 21, based on noise input from the second microphone 10b (step S35). In this case, the noise processor 22 may separate noise signals if necessary. Then, the voice signals with the noise removed are delivered to the signal filtering/combination processor 23. Then, the signal filtering/combination processor 23 is driven under the control of the controller 30, performs the additional filtering for corresponding voice signals, and delivers the resulting signals to the service selection unit 50 (step S36). The service selection unit 50 delivers the voice signals delivered from the signal filtering/combination processor 23 to the voice codec processor 70 under the control of the controller 30. Then, the voice codec processor 70 performs a coding for the delivered voice signals and outputs the resulting signals to the modem 90 (step S37). Then, the modem 90 transmits the delivered voice signals to a mobile communication terminal of a communication partner (step S38). Later, the controller 30 determines whether a user's voice communication is terminated (step S39). When it is determined that the voice communication is terminated, the controller 30 inactivates the first and second microphones 10a and 10b (step S40) and terminates operations.

Based on the determination result in step S32, when it is determined that the function key for voice recording is selected by the key input from the user key input unit 40, the controller 30 identifies whether the folder or the slider of the corresponding mobile communication terminal is closed or opened (step S41). When it is identified that the folder or the slider of the corresponding mobile communication terminal is opened, the controller 30 activates the first and second microphones 10a and 10b (step S42). Then, in order to perform voice recording, the controller 30 inputs voice signals and noise signals obtained through the first and second microphones 10a and 10b to the voice and noise processor 20 (step S43). In this case, loud voice signals and noise are input through the first microphone 10a, and relatively week voice signals and noise are input through the second microphone 10b. The voice signal identification unit 21 of the voice and noise processor 20 is driven under the control of the controller 30, and identifies voice signals from signals input through the first and second microphones 10a and 10b based on the signal identification information that is stored therein and is used for voice signal identification, and then outputs the resulting signals to the noise processor 22. The noise processor 22 is driven under the control of the controller 30, and performs a process of removing noise from among signals input from the voice signal identification unit 21 based on noise input from the second microphone 10b (step S44). In this case, the noise processor 22 may separate noise signals, if necessary. The voice signals without noise are delivered to the signal filtering/combination processor 23. The signal filtering/combination processor 23 is driven under the control of the controller 30, and performs the additional filtering for corresponding voice signals, and then delivers the resulting signals to the service selection unit 50 (step S45). The service selection unit 50 delivers voice signals delivered from the signal filtering/combination processor 23 to the voice recording function processor 60 under the control of the controller 30. Then, the voice recording function processor 60 subjects the delivered voice signals to the encoding and outputs the encoded voice signals to the memory 80 (step S46). The memory 80 stores the delivered voice signals for recording (step S47). Later, the controller 30 identifies whether the voice recording is terminated (step S48). When it is identified that the voice recording is terminated, the controller 30 inactivates the first and second microphones 10a and 10b (step S49), and terminates the operation.

When it is identified that the corresponding mobile communication terminal is closed in step S41, the controller 30 activates the second microphone 10b installed on the outside of the mobile communication terminal (step S50). In order to perform the voice recording, sound signals acquired through the second microphone 10b are input to the voice and noise processor 20 (step S51). Then, the noise processor 22 of the voice and noise processor 20 is driven under the control of the controller 30, and bypasses corresponding sound signals without subjecting the sound signals received from the second microphone 10b to the noise cancelation processing (step S52). The bypassed sound signals are delivered to the signal filtering/combination processor 23. The signal filtering/combination processor 23 is driven under the control of the controller 30, and delivers the bypassed sound signals to the service selection unit 50 without additional filtering. The service selection unit 50 delivers the sound signals delivered from the signal filtering/combination processor 23 to the voice recording function processor 60 under the control of the controller 30. Then, the voice recording function processor 60 subjects the delivered sound signals to encoding and outputs the encoded signals to the memory 80 (step S53). The memory 80 stores the delivered sound signals for recording (step S54). Later, the controller 30 identifies whether the recording is terminated (step S55). When the controller 30 identifies that the recording is terminated, the controller 30 inactivates the second microphone 10b (step S56) and terminates the operation.

When the controller 30 determines that a function key for the moving image photographing is selected by the key input from the user key input unit 40, in step S32, because the folder or the slider of the corresponding mobile communication terminal is open for the moving image photographing, the controller 30 activates the first and second microphones 10a and 10b (step S57) and inputs the sound signals acquired from the moving image photographing through the first and second microphones 10a and 10b to the voice and noise processor 20 (step S58). Then, the voice signal identification unit 21 of the voice and noise processor 20 is driven under the control of the controller 30, and outputs the sound signals acquired from the first and second microphones 10a and 10b, without processing, to the noise processor 22. The noise processor 22 is driven under the control of the controller 30, and bypasses the sound signals input from the first and second microphones 10a and 10b without noise cancelation processing, and then delivers the bypassed signals to the signal filtering/combination processor 23 (step S59).

In this case, it is determined whether the selected recording mode is either a mono mode or a stereo mode (step S60). Based on the determination result in step S60, if the selected recording mode is a mono mode, the signal filtering/combination processor 23 combines and synthesizes two sound signals without subjecting the sound signals of the first and second microphones 10a and 10b, bypassed and delivered from the noise processor 22, to the additional filtering processing, and then delivers the resulting signals to the service selection unit 50. The service selection unit 50 delivers the sound signals delivered from the signal filtering/combination processor 23 to the voice recording function processor 60 under the control of the controller 30 (step S61).

Based on the determination result in step S60, when the selected recording mode is a stereo mode, the signal filtering/combination processor 23 delivers the sound signals to the service selection unit 50 without subjecting the sound signals of the first and second microphones 10a and 10b, bypassed and delivered from the noise processor 22, to the additional filtering processing or to signal combination. Then, the service selection unit 50 delivers the sound signals delivered from the signal filtering/combination processor 23 to the voice recording function processor 60 under the control of the controller 30 (step S66). Then, the stereo processor 100 of the voice recording function processor 60 subjects the delivered sound signals to a stereo processing (step S67).

Thereafter, the voice recording function processor 60 encodes the sound signals, which have been subjected to the mono processing or the stereo processing, and outputs the encoded sound signals to the memory 80 (step S62). Then, the memory 80 stores the delivered sound signals for recording (step S63). Later, the controller 30 identifies whether the moving image photographing is terminated (step S64). As a result of the identification in step S64, when the controller 30 identifies that the moving image photographing is terminated, the controller 30 inactivates the first and second microphones 10a and 10b (step s65), and terminates the operation.

As described above, according to the apparatus for voice processing of the mobile communication terminal according to the present invention, in case of performing voice communication, the voice and noise processor 20 removes noise from among voice and noise signals input through the first and second microphones 10a and 10b and outputs the resulting signals to the service selection unit 50, the service selection unit 50 delivers the voice signals with the noise removed to the voice codec processor 70, and the voice codec processor 70 subjects the corresponding voice signals to coding and transmits the resulting signals through the modem 90 to a mobile communication terminal of a communication partner, so that it is possible to achieve good-quality voice communication.

Moreover, in case of performing voice recording, when the folder or the slider of the mobile communication terminal is opened, the voice and noise processor 20 removes noise from among voice and noise signals input through the first and second microphones 10a and 10b and outputs the resulting signals to the service selection unit 50, the service selection unit 50 delivers the voice signals with the noise removed to the voice recording function processor 60, and the voice recording function processor 60 subjects the delivered signals to encoding and stores the resulting signals in the memory 80 for recording. Further, in case of performing voice recording, when the folder or the slider of the mobile communication terminal is closed, the voice and noise processor 20 bypasses the signals input through the first and second microphones 10a and 10b without a noise cancelation processing or an additional filtering processing, and outputs the bypassed signals to the service selection unit 50, and the service selection unit 50 delivers the corresponding signals to the voice recording function processor 60, and the voice recording function processor 60 subjects the corresponding signals to encoding and stores the resulting signals for recording. As such, when the voice recording is performed in a state where the folder or the slider of the mobile communication terminal is closed, the user manually operates a recording function key installed to be exposed to the outside of the mobile communication terminal in order to perform voice recording.

And, when a moving image photographing is performed in a state where the folder or the slider of the mobile communication terminal is opened, the voice and noise processor 20 either combines corresponding sound signals of the first and second microphones 10a and 10b without a noise cancelation processing or an additional filtering processing for the sound signals input through corresponding first and second microphones 10a and 10b, or bypasses the sound signals without combination, and outputs the resulting signals to the service selection unit 50, the service selection unit 50 delivers the corresponding combined sound signals to the voice recording function processor 60, and the voice recording function processor 60 either encodes the delivered signals in the mono mode without processing, or subjects the bypassed sound signals to the stereo processing before encoding, and then stores the resulting signals in the memory 80 for recording.

Meanwhile, although it is assumed in the above description that, in case of performing voice recording, when the folder or the slider of the mobile communication terminal is opened, the voice and noise processor 20 removes and records noise from signals input through the first and second microphones 10a and 10b, and when the folder or the slider of the mobile communication terminal is closed, the voice and noise processor 20 removes noise for sound signals input through the second microphone 10b and records the resulting signals without the additional filtering processing, the scope of the invention is not to be limited by the above illustration. When voice recording is performed in a state where the folder or slider of the mobile communication terminal is opened, the voice and noise processor 20 can also combine and record the sound signals of the first and second microphone 10a and 10b without subjecting the sound signals input through the first and second microphones 10a and 10b to the noise cancelation processing or the additional filtering processing.

While the present invention has been shown and described with reference to certain exemplary embodiments thereof, it will be understood by those skilled in the art that various changes in form and details may be made therein without departing from the spirit and scope of the invention as defined by the appended claims.

INDUSTRIAL APPLICABILITY

As described above, according to the present invention, by using a plurality of microphones, it is possible to remove environmental noise at the time of voice communication, thereby performing high-quality voice communication and video telephony. Also, it is possible to perform voice recording even when a user does not open a mobile communication terminal. When voice is recorded or when sound is recorded during the moving image photographing, by efficiently employing a plurality of microphones provided on the mobile communication terminal, it is possible to achieve high-quality recording. Furthermore, even when the folder or the slider of the mobile communication terminal is closed, it is possible to perform recording conveniently. Therefore, the present invention can provided improved convenience in using a mobile communication terminal.

The invention claimed is:

1. An apparatus for voice processing in a mobile communication terminal, the apparatus comprising:
  a first microphone used as a main microphone for inputting sound signals, the first microphone being installed on a body of the mobile communication terminal;
  a second microphone used as a secondary microphone for inputting sound signals, the second microphone being installed to be exposed to the outside of the mobile communication terminal and being arranged in a direction different from that of the first microphone;
  a voice and noise processor for canceling noise from among the sound signals input through the first and second microphones and outputting the resulting signals;
  a service selection unit for switching paths of signals input from the voice and noise processor and delivering the resulting signals;
  a voice recording function processor for encoding the signals delivered through the service selection unit, storing the encoded signals in a memory, and recording the stored signals;
  a voice codec processor for coding the signals delivered through the service selection unit and outputting the coded signals to a modem; and
  a controller for activating the first and second microphones according to the user's function key input and controlling operations of the voice and noise processor and the service selection unit.

2. The apparatus as claimed in claim 1, wherein the voice and noise processor comprises:
  a voice signal identification unit for performing an operation under the control of the controller, and identifying and outputting voice signals from among input signals based on signal identification information, used for voice signal identification and stored therein, when receiving signals input through the first and second microphones;
  a noise processor for performing an operation under the control of the controller, and canceling noise from among voice signals input from the voice signal identification unit based on the noise of the signals input through the second microphone, or bypassing the voice signals input from the voice signal identification unit and the signals input from the second microphone without a noise cancelation processing; and
  a signal filtering/combination processor for performing an operation under the control of the controller, and performing an additional filtering for the noise-free signals input through the noise processor, combining two signals bypassed and input through the noise processor, or bypassing the signals and then delivering the resulting signals to the service selection unit.

3. The apparatus as claimed in claim 1, wherein the voice recording function processor comprises a stereo processor for subjecting the sound signals input through the first and second microphones to a stereo processing.

4. The apparatus as claimed in claim 3, wherein the stereo processor comprises:
  a first delay time adjustment unit for delaying input signals of the first microphone, and a second delay time adjustment unit for delaying input signals of the second microphone, in order to synchronize the input signals of the first microphone with the input signals of the second microphone;
  a first delay time controller for delaying the synchronized input signals of the first microphone for a predetermined time;
  a first multiplier for reducing an output value of the first delay time controller with a predetermined ratio;
  a first adder for adding an output value of the first multiplier and an output value of the second delay time adjustment unit;
  a second delay time controller for delaying the synchronized input signals of the second microphone for a predetermined time;
  a second multiplier for reducing an output value of the second delay time controller with a predetermined ratio;
  a second adder for adding an output value of the second multiplier and an output value of the first delay time adjustment unit; and
  a voice codec processor for encoding the output of the first adder and the output of the second adder.

5. The apparatus as claimed in claim 3, wherein the voice and noise processor comprises:
  a voice signal identification unit for performing an operation under the control of the controller, and identifying and outputting voice signals from among input signals based on the signal identification information, which is used for voice signal identification and is stored therein, when receiving signals input through the first and second microphones;
  a noise processor for performing an operation under the control of the controller, and either canceling noise from among voice signals input from the voice signal identification unit based on the noise of the signals input through the second microphone or bypassing the voice signals input from the voice signal identification unit 21 and the signals input through the second microphone without the noise cancelation processing; and
  a signal filtering/combination processor for performing an operation under the control of the controller, and either performing an additional filtering for the noise-free signals input through the noise processor, combining the two input signals bypassed by the noise processor, or bypassing the signals and then delivering the resulting signals to the service selection unit.

6. An apparatus for voice processing in a mobile communication terminal, the apparatus comprising:
  a first microphone installed on one side of the mobile communication terminal;
  a second microphone installed on the other side of the mobile communication terminal;
  a voice and noise processor for bypassing and outputting sound signals received through the first microphone and sound signals received through the second microphone, or canceling and outputting noise from among the first and second sound signals, respectively;
  a voice recording function processor for encoding signals output from the voice and noise processor; and
  a controller for controlling operations of the voice and noise processor and the voice recording function processor based on the recording mode of the first and second sound signals.

7. The apparatus as claimed in claim 6, wherein, when the recording mode of the first and second sound signals is a mono mode, the voice and noise processor comprises:
  a noise processor for canceling noise from the first and second sound signals; and
  a signal filtering/combination processor for combining the noise-free first sound signals with the noise-free second sound signals, thereby generating synthesized signals.

8. The apparatus as claimed in claim 6, wherein, when the recording mode of the first and second sound signals is a mono mode, the voice and noise processor comprises:
   a noise processor for bypassing the first and second sound signals without noise cancelation processing; and
   a signal filtering/combination processor for combining the bypassed first and second sound signals, thereby generating synthesized signals.

9. The apparatus as claimed in claim 6, wherein, when the recording mode of the first and second sound signals is a stereo mode, the voice and noise processor bypasses the first and second sound signals without noise cancelation processing.

10. A method for processing voice in a mobile communication terminal, the method comprising the steps of:
   when a voice communication function is selected, activating, by a controller, a first microphone primarily used for inputting sound signals and a second microphone, which is used for inputting sound signals secondarily and is installed in a direction different from that of the first microphone, canceling, by a voice and noise processor, noise from among signals input through the first microphone based on the noise of the signals input through the second microphone, performing additional filtering, and delivering the filtered signals to a voice codec processor, and coding, by the voice codec processor, the delivered signals and outputting the coded signals to a modem; and
   in case a folder or a slider of the mobile communication terminal is opened when a voice recording is selected, activating the first and second microphones by the controller, canceling noise from among signals input through the first and second microphones based on the noise of the signals input through the second microphone, performing additional filtering, and delivering the filtered signals via the service selection unit to the voice recording function processor by the voice and noise processor, and encoding the delivered signals and storing and recording the resulting signals in a memory by a voice recording function processor.

11. The method as claimed in claim 10, wherein, when a moving image photographing function is selected, the controller activates the first and second microphones, the voice and noise processor combines the signals of the first microphone with the signals of the second microphone without subjecting the signals input through the first and second microphones to noise cancelation processing or additional filtering processing and then delivers the resulting signals via a service selection unit to the voice recording function processor, and the voice recording function processor encodes the delivered signals and stores the resulting signals in a memory for mono-based recording.

12. The method as claimed in claim 10, further comprising the step of:
   when a moving image photographing function is selected, activating the first and second microphones by the controller, bypassing the signals of signals of the first and second microphone without subjecting the signals input through the first and second microphones to noise cancelation processing or additional filtering processing and then delivering the resulting signals via a service selection unit to the voice recording function unit by the voice and noise processor, and subjecting the delivered signals to stereo processing, and encoding the resulting signals and storing the encoded signals in a memory for stereo-based recording by the voice recording function processor.

13. The method as claimed in claim 10, further comprising the step of:
   when a voice recording function is selected, activating the second microphone by the controller, delivering signals of the second microphone via the service selection unit to the voice recording function processor without subjecting the signals input through the second microphone to noise cancelation processing or additional filtering processing by the voice and noise processor; and encoding the delivered signals and storing the encoded signals in a memory for recording by the voice recording function processor, in case the folder or the slider of the mobile communication terminal is closed.

14. The method as claimed in claim 13, wherein the mobile communication terminal comprises a recording function key for selecting a voice recording function when the folder or the slider of the mobile communication terminal is closed, the recording function key being installed to be exposed to the outside of the mobile communication terminal.

15. The method as claimed in claim 10, further comprising the step of:
   when a voice recording function is selected, activating the first and second microphones by the controller, combining the signals of the first and second microphones without subjecting the signals input through the first and second microphones to noise cancelation processing or additional filtering processing and delivering the resulting signals via the service selection unit to the voice recording function processor by the voice and noise processor, and encoding the delivered signals and storing and recording the encoded signals in a memory for recording by the voice recording function processor, in case the folder or the slider is opened.

16. A method for voice processing in a mobile communication terminal, the method comprising the steps of:
   activating, by a controller, a first microphone primarily used for inputting sound signals and a second microphone, which is used for secondarily inputting sound signals and is installed to be exposed outside in a direction different from that of the first microphone, canceling, by a voice and noise processor, noise from the signals input from the first microphone based on the noise of the signals input from the second microphone and subjecting the resulting signals to additional filtering and then delivering the filtered signals to a voice codec processor, and coding, by the voice codec processor, the delivered signals and outputting the coded signals to a modem, when a voice communication function is selected; and
   activating, by the controller, the first and second microphones, combining, by the voice and noise processor, the signals of the first and second microphones without subjecting the signals input through the first and second microphones to noise cancelation processing or additional filtering processing and delivering the combined signals to a voice recording function processor via a service selection unit, and encoding, by the voice recording function processor, the delivered signals and storing the encoded signals in a memory for a mono-based recording, when a moving image photographing function is selected.

17. The method as claimed in claim 16, further comprising the step of, when a moving image photographing function is selected, activating the first and second microphones by the controller, combining the signals of the first and second microphones without subjecting the signals input through the first and second microphones to noise cancelation processing or additional filtering processing and delivering the combined signals via the service selection unit to the voice recording function processor by the voice and noise processor, and encoding the delivered signals and storing the encoded signals for mono-based recording by the voice recording function processor.

18. A method for processing sound signals received through first and second microphones installed on a mobile communication terminal, the method comprising the steps of:
  (a) receiving a first sound signal through the first microphone and receiving a second sound signal through the second microphone;
  (b) determining whether the recording mode of the received first and second sound signals is set to a mono mode or a stereo mode;
  (c) combining the first sound signals with the second sound signals to generate synthesized signals when the recording mode of the received first and second signals is set to a mono mode, based on the determination result in step (b);
  (d) encoding the combined signals and storing the encoded signals in a mono mode; and
  (e) encoding each of the first sound signals and the second sound signals and storing the encoded signals in a stereo mode when the recording mode of the received first and second sound signals is set to a stereo mode, based on the determination result in step (b).

19. The method as claimed in claim 18, further comprising the step of canceling the noise of the first sound signal based on the noise of the second sound signals when the recording mode of the first and second sound signals is set to a mono mode, based on the determination result in step (b).

* * * * *